United States Patent
Stinebring et al.

(10) Patent No.: US 10,279,834 B2
(45) Date of Patent: May 7, 2019

(54) RAKE ADJUSTMENT MECHANISM FOR STEERING COLUMN

(71) Applicant: STEERING SOLUTIONS IP HOLDING CORPORATION, Saginaw, MI (US)

(72) Inventors: Scott A. Stinebring, Auburn, MI (US); Robert D. Maida, Pinconning, MI (US); Nicholas M. Messing, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 20 days.

(21) Appl. No.: 15/279,977

(22) Filed: Sep. 29, 2016

(65) Prior Publication Data

US 2018/0086363 A1 Mar. 29, 2018

(51) Int. Cl.
*B62D 1/187* (2006.01)
*B62D 1/181* (2006.01)

(52) U.S. Cl.
CPC .............. *B62D 1/187* (2013.01); *B62D 1/181* (2013.01)

(58) Field of Classification Search
CPC ................................ B62D 1/187; B62D 1/185
See application file for complete search history.

(56) References Cited

U.S. PATENT DOCUMENTS

| 5,588,332 A * | 12/1996 | Hedderly | B62D 1/195 188/371 |
|---|---|---|---|
| 6,079,743 A | 6/2000 | Grams | |
| 7,159,904 B2 | 1/2007 | Schafer et al. | |
| 9,022,427 B2 * | 5/2015 | Schnitzer | B62D 1/16 280/775 |
| 2009/0174177 A1 * | 7/2009 | Gerzseny | B62D 1/185 280/775 |
| 2013/0276569 A1 * | 10/2013 | Davies | B62D 1/16 74/492 |
| 2014/0069223 A1 * | 3/2014 | Bang | B62D 1/185 74/493 |
| 2015/0232117 A1 * | 8/2015 | Stinebring | B62D 1/181 74/493 |
| 2015/0251683 A1 * | 9/2015 | Caverly | B62D 1/189 74/493 |
| 2015/0375770 A1 * | 12/2015 | Buzzard | B62D 1/184 74/493 |

(Continued)

*Primary Examiner* — Darlene P Condra
(74) *Attorney, Agent, or Firm* — Cantor Colburn LLP

(57) ABSTRACT

A rake adjustment mechanism of a steering column assembly includes a lower jacket defining a first tapered slot and a second tapered slot, the first and second tapered slots disposed on opposing sides of the lower jacket. Also included is a rake bracket coupled to the lower jacket. Further included is a first rake guide and a second rake guide, each rake guide a single, integrally formed component and disposed between the lower jacket and rake bracket, the first rake guide disposed at least partially within the first tapered slot and the second rake guide disposed at least partially within the second tapered slot, each rake guide translatable within the tapered slot in an axial direction of the lower jacket. Yet further included is a rake bolt extending through the lower jacket, the rake bracket and the first and second rake guides.

19 Claims, 5 Drawing Sheets

(56) References Cited

U.S. PATENT DOCUMENTS

| | | | |
|---|---|---|---|
| 2016/0039450 A1* | 2/2016 | Johta | B62D 1/184 74/493 |
| 2016/0167695 A1* | 6/2016 | Hagiwara | B62D 1/184 74/493 |
| 2016/0252133 A1* | 9/2016 | Caverly | F16C 29/02 74/493 |
| 2016/0375929 A1* | 12/2016 | Rouleau | B62D 1/181 74/493 |

* cited by examiner

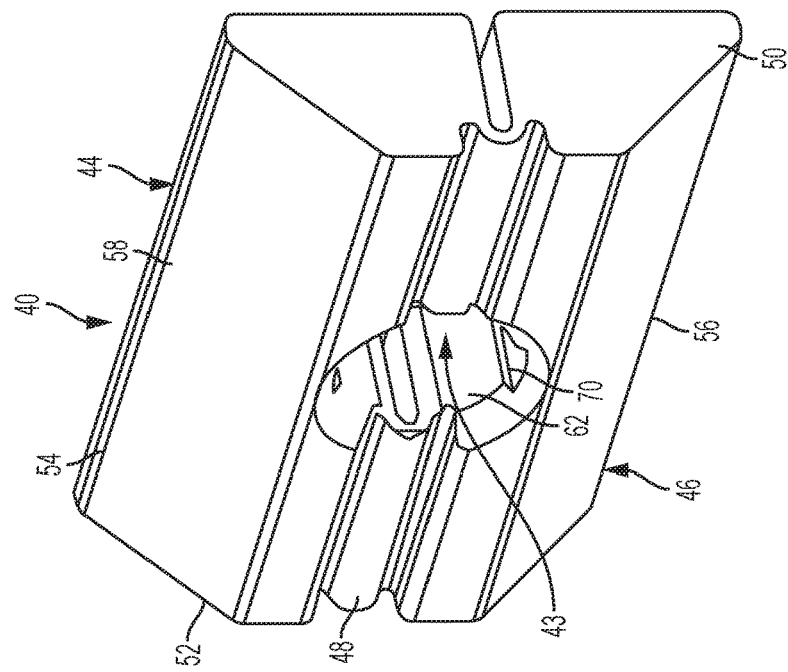
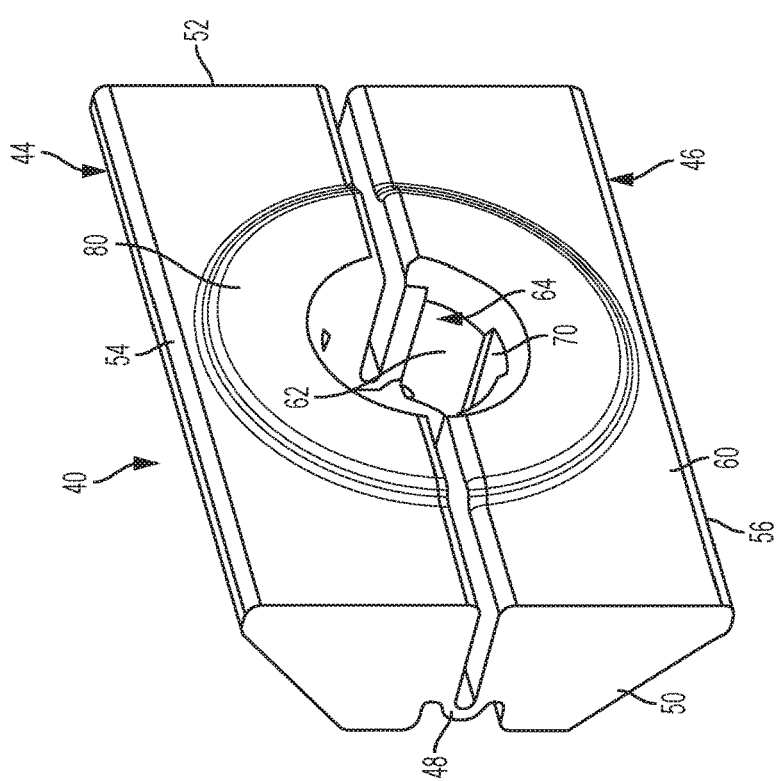

RAKE ADJUSTMENT MECHANISM FOR STEERING COLUMN

BACKGROUND

The embodiments described herein relate generally to a steering column assembly of a vehicle and, more particularly, a rake adjustment mechanism for such assemblies.

A steering column assembly of a vehicle adjustable in a rake (tilt) direction typically includes a power-rake assembly or mechanism. A series of several components or parts of the power-rake mechanism must be radially and laterally de-lashed to one another to ensure a quality, lash-free feel and performance of the steering column assembly during such adjustment. More specifically, joints between and among the components must be held sufficiently rigidly together to be lash-free, but not too rigid as to inhibit the adjustment. Thus, the joints must be able to be tuned.

Some mechanisms that facilitate raking adjustment cause the column jacket and steering shaft to translate axially along the centerline of the steering shaft. Some applications require an axially fixed lower steering shaft, thereby making inherent axial translation undesirable and unsuitable. Some efforts to eliminate translation utilize tight tolerance interface components or more complicated assemblies with additional components.

SUMMARY OF INVENTION

In accordance with an embodiment of the invention, a rake adjustment mechanism of a steering column assembly includes a lower jacket defining a first tapered slot and a second tapered slot, the first and second tapered slots disposed on opposing sides of the lower jacket. Also included is a rake bracket coupled to the lower jacket. Further included is a first rake guide and a second rake guide, each rake guide a single, integrally formed component and disposed between the lower jacket and rake bracket, the first rake guide disposed at least partially within the first tapered slot and the second rake guide disposed at least partially within the second tapered slot, each rake guide translatable within the tapered slot in an axial direction of the lower jacket. Yet further included is a rake bolt extending through the lower jacket, the rake bracket and the first and second rake guides.

According to another embodiment of the invention, a rake adjustment mechanism of a steering column includes a lower jacket defining a first tapered slot and a second tapered slot, the first and second tapered slots disposed on opposing sides of the lower jacket. Also included is a rake bracket coupled to the lower jacket. Further included is a first rake guide and a second rake guide, each rake guide including a first and second portion structurally separate from each other and together defining a rake bolt aperture, each rake guide disposed between the lower jacket and rake bracket, the first rake guide disposed at least partially within the first tapered slot and the second rake guide disposed at least partially within the second tapered slot, each rake guide translatable within the tapered slot in an axial direction of the lower jacket. Yet further included is a rake bolt extending through the lower jacket, the rake bracket and the first and second rake guides.

According to yet another embodiment of the invention, provided is a rake guide disposable between a rake bracket and a lower jacket of an adjustable steering column, the rake guide translatable within a tapered slot of the lower jacket. The rake guide includes a first portion and a second portion flexibly connected to each other with a hinge extending along a length of the rake guide. Also included is a first tapered wall segment and a second tapered wall segment to form a trapezoidal geometry of the rake guide. Further included is an aperture wall defining a rake bolt aperture, the aperture wall defining a plurality of recesses extending radially outwardly and equally spaced from each other.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is perspective view of a first side of a rake guide according to an aspect of the invention;

FIG. 4 is a perspective view of a second side of the rake guide of FIG. 3;

DETAILED DESCRIPTION

Figure 1:
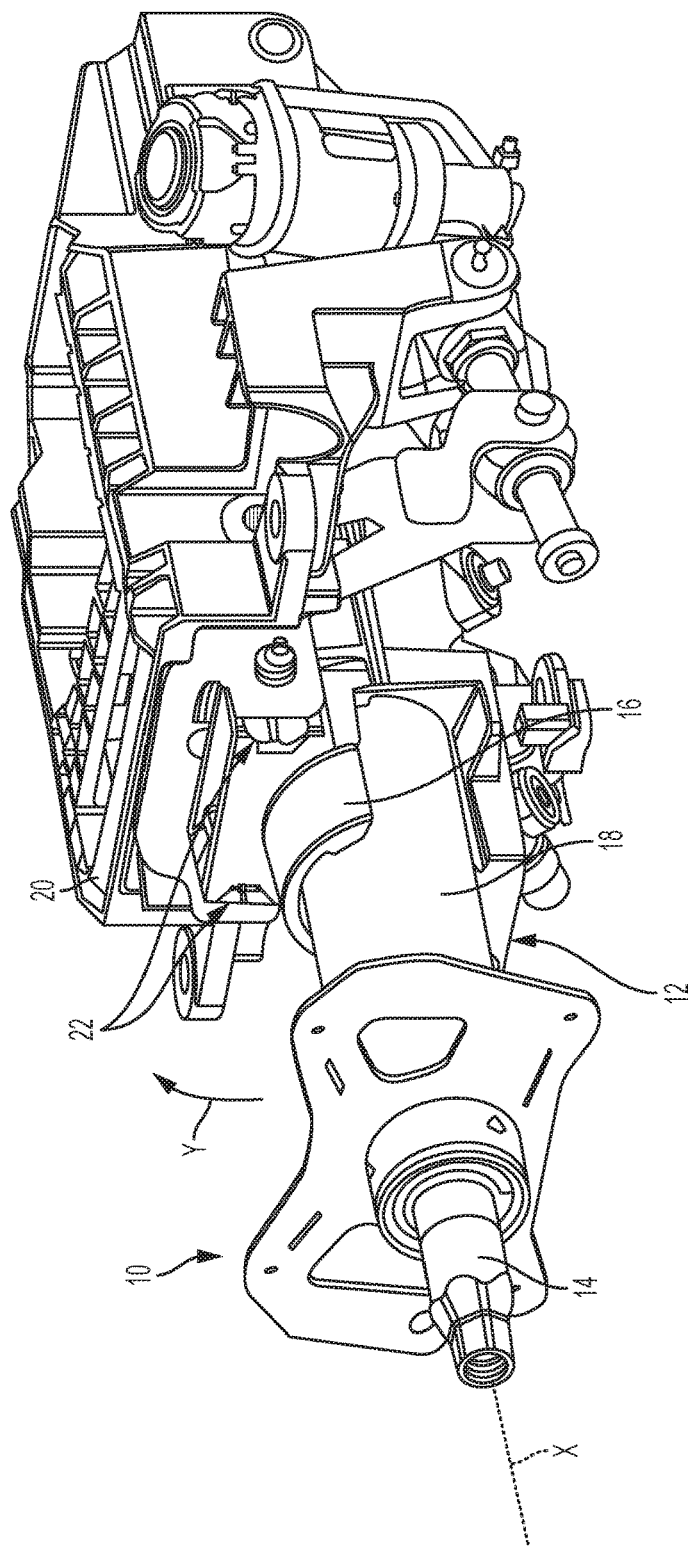
FIG. 1 is a perspective view of an adjustable steering column assembly.

Referring now to the Figures, where the invention will be described with reference to specific embodiments, without limiting same, FIG. 1 illustrates a steering column assembly generally indicated with numeral 10. The steering column assembly 10 is for a vehicle and extends along a longitudinal axis X. The steering column assembly 10 is adjustable in both a rake direction Y generally transverse to the longitudinal axis X (tilt) and a telescopic direction generally parallel with the longitudinal axis X (i.e., adjustable along the longitudinal axis X). The steering column assembly 10 includes a column-jacket assembly 12 and a steering shaft 14 extending along the longitudinal axis X. The column jacket assembly 12 includes an articulating lower jacket 16 and an upper jacket 18 in telescopic engagement with the lower jacket 16. A mounting bracket 20 facilitates attachment of the column-jacket assembly 12 to a vehicle.

Figure 2:
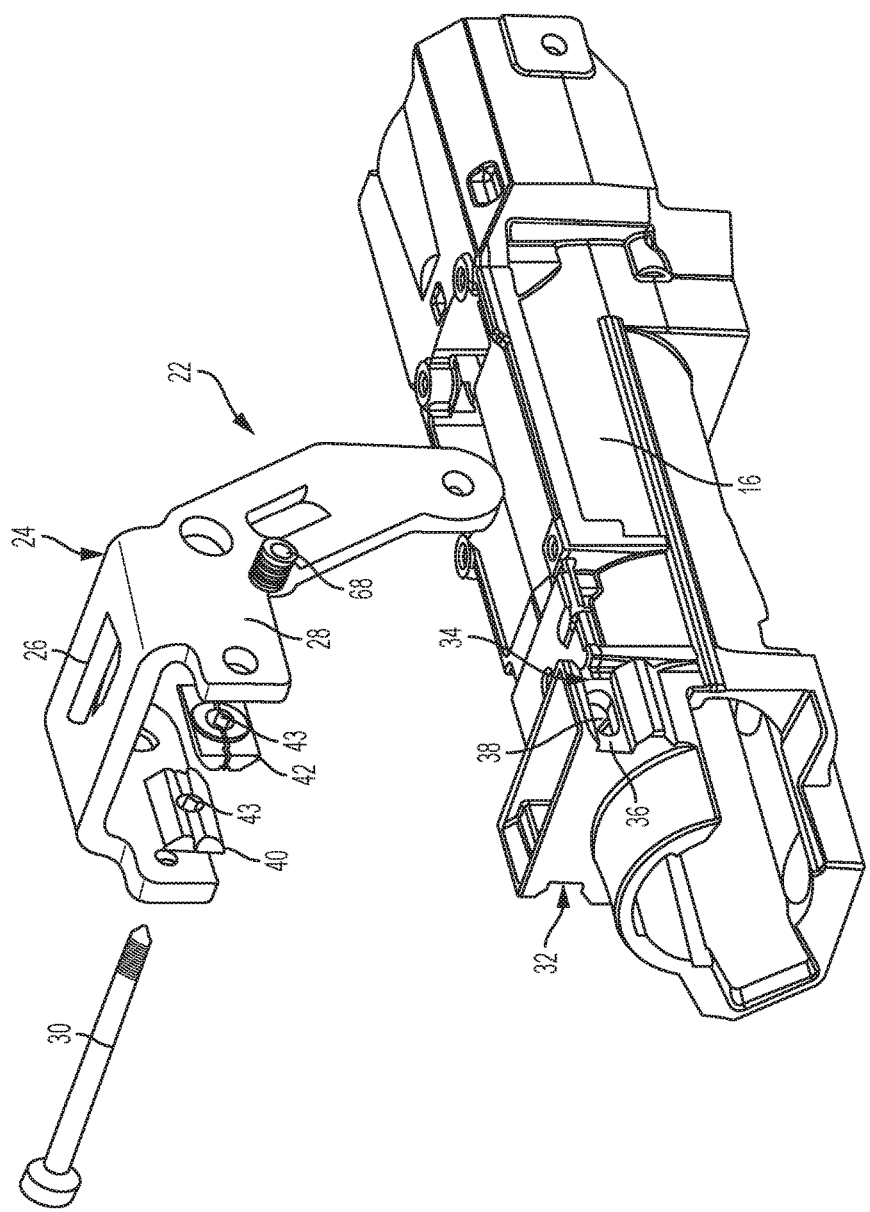
FIG. 2 is a perspective, disassembled view of a rake adjustment mechanism of the steering column assembly.

As shown in FIGS. 1 and 2, a rake adjustment mechanism 22 is provided to allow a rake bracket pivot axis to slide axially relative to the lower jacket while maintaining a stiff, lash-free structural joint, as will be appreciated from the description herein.

FIG. 2 illustrates the rake adjustment mechanism 22 in greater detail in a disassembled view. The rake adjustment mechanism 22 includes a rake bracket 24 coupled to the lower jacket 16 and is actuated by an actuation mechanism that may be manual or powered, as shown in FIG. 1. The rake bracket 24 includes a main portion 26 and a pair of arms 28 extending from opposed first and second sides of the main portion 26. Each arm is connected to the above-noted actuation mechanism. Each side of the main portion 26 defines an aperture for receiving a rake bolt 30 therethrough.

The main portion sides are disposed outwardly of tapered slots of the lower jacket 16. In particular, a first tapered slot 32 and a second tapered slot 34 are defined by the lower jacket 16. The tapered slots 32, 34 substantially extend in a longitudinal direction of the lower jacket 16. A slot wall 36 that defines each tapered slot also defines an aperture 38. The slot wall 36 includes at least one angled portion.

A first rake guide 40 and a second rake guide 42 are disposed at least partially within the tapered slots 32, 34, respectively, and between respective inner surfaces of the rake bracket 24 and the slot wall 36. The rake guides 40, 42 each define respective rake bolt apertures 43. The rake bolt 30 extends from a first end to a second end and substantially transversely to the longitudinal axis X. The rake bolt 30 extends through the apertures of the rake bracket 24, the rake guides 40, 42, and the lower jacket 16 in an assembled condition to provide a rake axis that is rotated about during adjustment.

Referring now to FIGS. 3 and 4, with continued reference to FIG. 2, a first embodiment of the rake guides 40, 42 is illustrated. Each of the rake guides 40, 42 are formed of a single, integrally formed component. Each rake guide includes a first portion 44 and a second portion 46 that are flexibly connected to each other with a hinge 48. In the illustrated embodiment, the first and second portions 44, 46 are halves of the rake guide, but it is contemplated that one portion may account for more of the total area than the other portion in alternative embodiments. The rake guides 40, 42 extend from a first side 50 to a second side 52, from a top edge 54 to a bottom edge 56, and from a first wall 58 to a second wall 60. As discussed above, the rake guides 40, 42 are at least partially disposed within the tapered slots 32, 34, respectively. Seating of the rake guides 40, 42 within the tapered slots 32, 34 is facilitated by the corresponding tapered geometry of the slot wall 36 and the first wall 58 of the rake guides. In the illustrated embodiment, two tapered wall segments of the rake guides 40, 42 are included to form a substantially trapezoidal geometry of the rake guides 40, 42. Disposal of the rake guides 40, 42 within the tapered slots 32, 34 allow the rake guides 40, 42 to translate axially, but vertical and lateral motion is constrained by the corresponding wall geometries described above.

Figure 8:
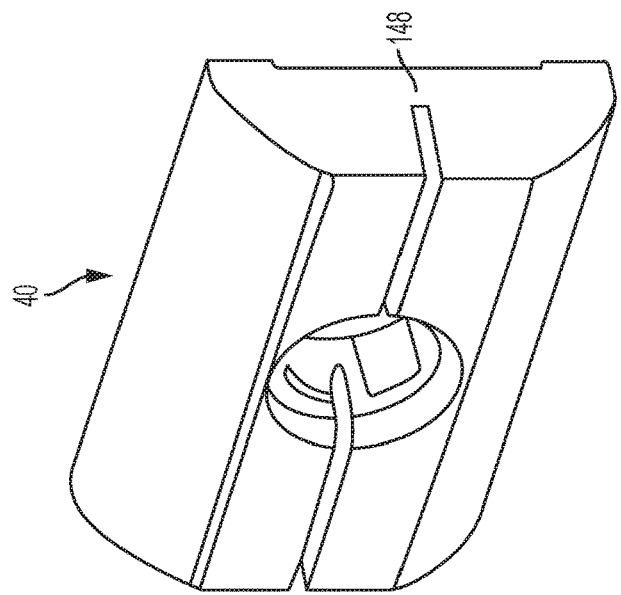
FIG. 8 is a perspective view of a second side of the rake guide of FIG. 7.
Figure 7:
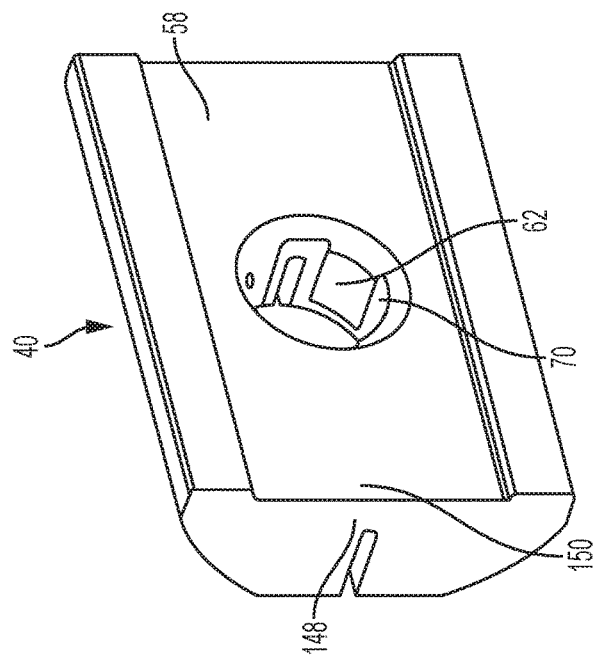
FIG. 7 is a perspective view of a first side of a rake guide according to another aspect of the invention.

The distance from the first side 50 to the second side 52 of the rake guides 40, 42 defines a length of the rake guide. The hinge 48 extends along the length of the rake guide. In some embodiments, the hinge 48 extends along an entire length thereof. In the illustrated embodiment, the hinge 48 is a ribbed feature that terminates at ends that are recessed from the first wall 58 of the rake guide. In another embodiment of the rake guides 40, 42, a hinge 148 is a wall 150 that is flush with the entire first wall 58 of the rake guide to provide a single, flush wall, as shown in FIGS. 7 and 8. Irrespective of the precise hinge structure, the first and second portions 44, 46 of the rake guides 40, 42 are permitted to move vertically relative to each other due to the hinge. Tapered contact pads of each tapered wall segment of the first wall 58, combined with the flexible relative movement provided by the hinge 48, 148 allows inner contact pads 62 located along an aperture wall 64 of the rake bolt apertures 43 to adjust to the size of the rake bolt 30 when a rake nut 68 is tightened onto the ends of the rake bolt 30.

The inner contact pads 62 are present along the aperture walls 64. The aperture wall 64 defines recesses 70 that extend radially outwardly from the rake bolt aperture 43. In some embodiments, the recesses 70 are equally spaced from each other, such as at a top center location, a first side location, a lower bottom location and a second side location. In some embodiments, the side locations correspond with the space disposed between the first and second portions 44, 46 of the rake guide. The clearances provided by the recesses 70 in such positions forces the contact interfaces between the aperture wall 64 and the rake bolt 30 away from these positions. This results in a lash free fit between the rake guide and the rake bolt 30 in both the vertical and axial direction. Lash in the vertical direction results in a loose feeling column with low natural frequency and stiffness. Lash in the axial direction results in an inconsistent rake load with poor noise performance during rake motion.

The inner contact pads 62 establish and maintain full surface contact with the rake bolt 30. Full surface contact between the inner contact pads 62 and the rake bolt 30, as well as full surface contact between the tapered pads of the first wall 58 with the slot wall 36 of the lower jacket 16, results in a tight, lash free interface with a large contact area for good column structural performance which provides in high stiffness and natural frequency while still allowing the rake bolt 30 to rotate relative to the rake guides 40, 42. Translation of the rake guides 40, 42 within the slots 32, 34 and relative to the lower jacket 16 allows the column assembly 10 to achieve rake motion, while not translating the steering shaft 14.

As shown in FIG. 3, a radial contact pad 80 is provided. The radial contact pad 80 extends from the second wall 60 in a manner that radially surrounds the rake bolt aperture 43. The radial contact pad 80 is engaged with the rake bracket 24 in an assembled condition. The radial contact pad 80 provides a large contact area for good lateral structural performance while also providing a constant contact area at the interface which assists in achieving a consistent rake load seen by the actuator mechanism, resulting in enhanced actuation noise performance.

Figure 5:
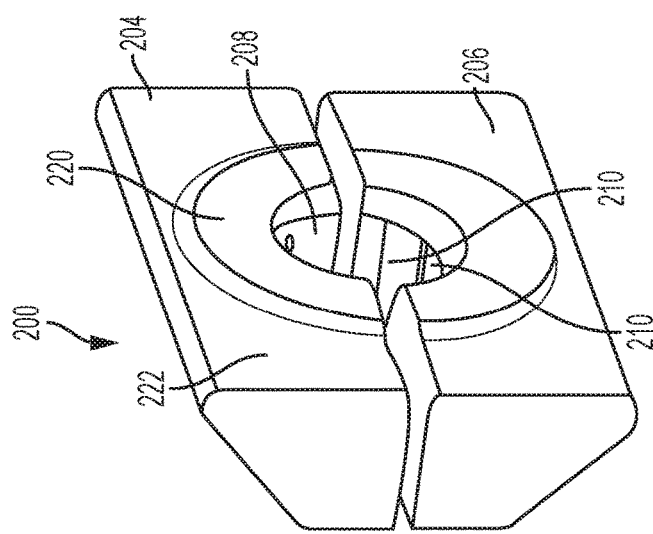
FIG. 5 is a perspective view of a first side of a rake guide according to another aspect of the invention.
Figure 6:
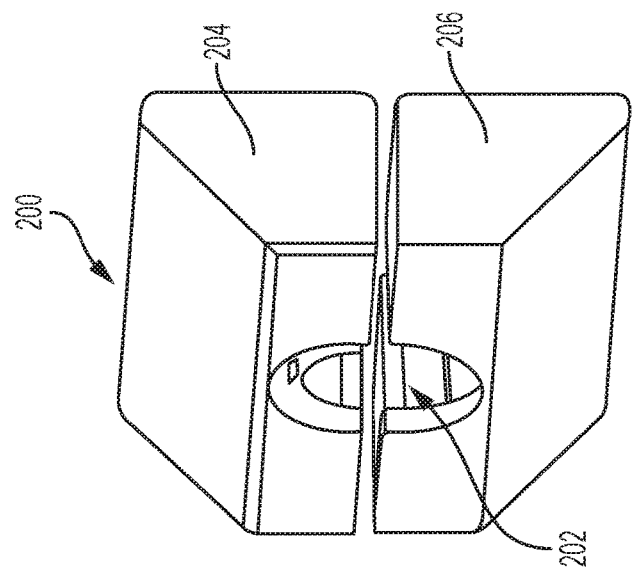
FIG. 6 is a perspective view of a second side of the rake guide of FIG. 5.

Referring now to FIGS. 5 and 6, the rake guide is shown according to another embodiment and referenced with numeral 200. The rake guide 200 is formed of multiple components that together define a rake bolt aperture 202 for receiving the rake bolt 30 therethrough. The rake guide 200 includes a first portion 204 and a second portion 206 that are separated by a space extending along a length of the rake guide 200. In the illustrated embodiment, the first and second portions 204, 206 are halves of the rake guide, but it is contemplated that one portion may account for more of the total area than the other portion in alternative embodiments. The rake bolt aperture 202 is defined by two semi-cylindrical wall segments 208 of each portion 204, 206. As with the embodiments described above, inner contact pads 210 located along the wall segments 208 of the rake bolt apertures 202 to adjust to the size of the rake bolt 30 when the rake nut 68 is tightened onto the ends of the rake bolt 30.

The inner contact pads 210 are present along the aperture walls 208. The wall segments 208 define recesses 212 that extend radially outwardly from the rake bolt aperture 202. In some embodiments, the recesses 212 are equally spaced from each other, such as at a top center location, a first side location, a lower bottom location and a second side location. In some embodiments, the side locations correspond with the space disposed between the first and second portions 204, 206 of the rake guide 200. The clearances provided by the recesses 212 at such positions forces the contact interfaces between the wall segments 208 and the rake bolt 30 away from these positions. As described above, this provides a lash free fit between the rake guide and the rake bolt 30 in both the vertical and axial direction. Lash in the vertical direction results in a loose feeling column with low natural frequency and stiffness. Lash in the axial direction results in an inconsistent rake load with poor noise performance during rake motion.

The inner contact pads 210 establish and maintain full surface contact with the rake bolt 30. Full surface contact between the inner contact pads 210 and the rake bolt 30, as well as full surface contact between the tapered pads with the slot wall 36 of the lower jacket 16, results in a tight, lash free interface with a large contact area for good column structural performance which provides in high stiffness and natural frequency while still allowing the rake bolt 30 to rotate relative to the rake guide 200. Translation of the rake guide 200 within the slots 32, 34 and relative to the lower jacket 16 allows the column assembly 10 to achieve rake motion, while not translating the steering shaft 14.

As shown in FIG. 5, a radial contact pad 220 is provided. The radial contact pad 220 extends from a wall 222 in a manner that radially surrounds the rake bolt aperture 202. The radial contact pad 220 is engaged with the rake bracket 24 in an assembled condition. The radial contact pad 220 provides a large contact area for good lateral structural performance while also providing a constant contact area at the interface which assists in achieving a consistent rake load seen by the actuator mechanism, resulting in enhanced actuation noise performance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rake adjustment mechanism of a steering column assembly comprising:
   a lower jacket defining a first tapered slot and a second tapered slot, the first and second tapered slots disposed on opposing sides of the lower jacket;
   a rake bracket coupled to the lower jacket;
   a first rake guide and a second rake guide, each rake guide a single, integrally formed component and disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
   a rake bolt extending through the lower jacket, the rake bracket and the first and second rake guides.

2. A rake adjustment mechanism of a steering column assembly comprising:
   a lower jacket defining a first tapered slot and a second tapered slot, the first and second tapered slots disposed on opposing sides of the lower jacket;
   a rake bracket coupled to the lower jacket;
   a first rake guide and a second rake guide, each rake guide a single, integrally formed component and disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
   a rake bolt extending through the lower jacket, the rake bracket and the first and second rake guides, each of the first and second rake guides comprising a first portion and a second portion flexibly connected to each other with a hinge.

3. The rake adjustment mechanism of claim 2, wherein the hinge extends along an entire length of the first and second rake guides.

4. The rake adjustment mechanism of claim 3, wherein the hinge terminates at first and second edges recessed from a wall of each of the rake guides to define outer contact pads engaged with walls of the tapered slots.

5. The rake adjustment mechanism of claim 3, wherein the hinge is flush with a wall of each of the rake guides to define a single, flush wall.

6. The rake adjustment mechanism of claim 2, wherein each of the first and second rake guides comprises at least one tapered wall corresponding to geometry of the first and second tapered slots.

7. The rake adjustment mechanism of claim 6, wherein each of the first and second rake guides are formed of a trapezoidal geometry.

8. The rake adjustment mechanism of claim 7, wherein the recesses are equally spaced from each other around a circumference of the aperture wall and located a top center position, a first side position, a lower center position, and a second side position.

9. A rake adjustment mechanism of a steering column assembly comprising:
   a lower jacket defining a first tapered slot and a second tapered slot, the first and second tapered slots disposed on opposing sides of the lower jacket;
   a rake bracket coupled to the lower jacket;
   a first rake guide and a second rake guide, each rake guide a single, integrally formed component and disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
   a rake bolt extending through the lower jacket, the rake bracket and the first and second rake guides, each of the first and second rake guides including an aperture wall defining a rake bolt aperture for receiving the rake bolt therethrough, the aperture wall defining a plurality of recesses extending radially outwardly providing inner contact pads in engagement with the rake bolt.

10. A rake adjustment mechanism of a steering column assembly comprising:
    a lower jacket defining a first tapered slot and a second tapered slot, the first and second tapered slots disposed on opposing sides of the lower jacket;
    a rake bracket coupled to the lower jacket;
    a first rake guide and a second rake guide, each rake guide a single, integrally formed component and disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
    a rake bolt extending through the lower jacket, the rake bracket and the first and second rake guides, each of the first and second rake guides including a radial contact pad protruding from a wall of each of the rake guides into engagement with the rake bracket.

11. The rake adjustment mechanism of claim 10, further comprising a fastener configured to be positioned onto the rake bolt, tightened, and seated on the rake bracket, the rake bolt being forced through the fastener, rake bracket, rake guides, and lower jacket and the rake bolt being seated on the rake bracket as the fastener is tightened and draws the rake bolt, fastener, rake bracket, rake guides, and lower jacket together as the fastener is being seated on the rake bracket, thereby de-lashing respective interfaces defined between and among the rake bolt, fastener, rake bracket, rake guides, and lower jacket.

12. A rake adjustment mechanism of a steering column comprising:
 a lower jacket defining a first tapered slot and a second tapered slot, the first and second tapered slots disposed on opposing sides of the lower jacket;
 a rake bracket coupled to the lower jacket;
 a first rake guide and a second rake guide, each rake guide including a first and second portion structurally separate from each other and together defining a rake bolt aperture, each rake guide disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
 a rake bolt extending through the lower jacket, the rake bracket and the first and second rake guides.

13. The rake adjustment mechanism of claim 12, wherein each of the first and second rake guides comprises at least one tapered wall corresponding to geometry of the first and second tapered slot.

14. A rake adjustment mechanism of a steering column comprising:
 a lower jacket defining a first tapered slot and a second tapered slot, the first and second tapered slots disposed on opposing sides of the lower jacket;
 a rake bracket coupled to the lower jacket;
 a first rake guide and a second rake guide, each rake guide including a first and second portion structurally separate from each other and together defining a rake bolt aperture, each rake guide disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
 a rake bolt extending through the lower jacket, the rake bracket and the first and second rake guides, each of the first and second rake guides comprising at least one tapered wall corresponding to geometry of the first and second tapered slots, each of the first and second rake guides formed of a trapezoidal geometry.

15. A rake adjustment mechanism of a steering column comprising:
 a lower jacket defining a first tapered slot and a second tapered slot, the first and second tapered slots disposed on opposing sides of the lower jacket;
 a rake bracket coupled to the lower jacket;
 a first rake guide and a second rake guide, each rake guide including a first and second portion structurally separate from each other and together defining a rake bolt aperture, each rake guide disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
 a rake bolt extending through the lower jacket, the rake bracket and the first and second rake guides, each of the first and second rake guides including an aperture wall defining a rake bolt aperture for receiving the rake bolt therethrough, the aperture wall defining a plurality of recesses extending radially outwardly providing inner contact pads in engagement with the rake bolt.

16. The rake adjustment mechanism of claim 15, wherein the recesses are equally spaced from each other around a circumference of the aperture wall and located a top center position, a first side position, a lower center position, and a second side position.

17. A rake adjustment mechanism of a steering column comprising:
 a lower jacket defining a first tapered slot and a second tapered slot, the first and second tapered slots disposed on opposing sides of the lower jacket;
 a rake bracket coupled to the lower jacket;
 a first rake guide and a second rake guide, each rake guide including a first and second portion structurally separate from each other and together defining a rake bolt aperture, each rake guide disposed between the lower jacket and rake bracket, the first rake guide disposed at least partially within the first tapered slot and the second rake guide disposed at least partially within the second tapered slot, each rake guide translatable within the tapered slot in an axial direction of the lower jacket; and
 a rake bolt extending through the lower jacket, the rake bracket and the first and second rake guides, each of the first and second rake guides including a radial contact pad protruding from a wall of each of the rake guides into engagement with the rake bracket.

18. The rake adjustment mechanism of claim 17, further comprising a fastener configured to be positioned onto the rake bolt, tightened, and seated on the rake bracket, the rake bolt being forced through the fastener, rake bracket, rake guides, and lower jacket and the rake bolt being seated on the rake bracket as the fastener is tightened and draws the rake bolt, fastener, rake bracket, rake guides, and lower jacket together as the fastener is being seated on the rake bracket, thereby de-lashing respective interfaces defined between and among the rake bolt, fastener, rake bracket, rake guides, and lower jacket.

19. A rake guide disposable between a rake bracket and a lower jacket of an adjustable steering column, the rake guide translatable within a tapered slot of the lower jacket and comprising:
 a first portion and a second portion flexibly connected to each other with a hinge extending along a length of the rake guide;
 a first tapered wall segment and a second tapered wall segment to form a trapezoidal geometry of the rake guide; and
 an aperture wall defining a rake bolt aperture, the aperture wall defining a plurality of recesses extending radially outwardly and equally spaced from each other.

* * * * *